(12) United States Patent
Morishita et al.

(10) Patent No.: US 6,654,088 B2
(45) Date of Patent: Nov. 25, 2003

(54) LIQUID CRYSTAL DISPLAY DEVICE

(75) Inventors: Shunsuke Morishita, Mobara (JP);
Hirokazu Yabe, Chousei (JP);
Yoshiyuki Urashima, Mobara (JP)

(73) Assignees: Hitachi, Ltd., Tokyo (JP); Hitachi Electronic Devices Co., Ltd., Chiba-ken (JP)

( * ) Notice: Subject to any disclaimer, the term of this patent is extended or adjusted under 35 U.S.C. 154(b) by 201 days.

(21) Appl. No.: 09/973,833

(22) Filed: Oct. 11, 2001

(65) Prior Publication Data
US 2002/0057405 A1 May 16, 2002

(30) Foreign Application Priority Data

Oct. 17, 2000 (JP) ........................................ 2000-316282

(51) Int. Cl.7 ............................................ G02F 1/1335
(52) U.S. Cl. ........................... 349/113; 349/62; 349/68; 349/65
(58) Field of Search .............................. 349/62, 65, 68, 349/113

(56) References Cited

U.S. PATENT DOCUMENTS 6,147,725 A * 11/2000 Yuuki et al. .................. 349/65
6,273,577 B1 * 8/2001 Goto et al. .................... 362/31

* cited by examiner

Primary Examiner—Long Pham
Assistant Examiner—Wai-Sing Louie

(57) ABSTRACT

The object of the invention is to reduce unevenness in luminance caused on the display surface of a liquid crystal display element in a liquid crystal display device employing a direct backlight unit.

To accomplish this object, the invention provides a liquid crystal display device having a plurality of light sources and a reflection member disposed opposite to the display surface of the liquid crystal display element, characterized in that the protrusions are provided in the regions between the plurality of light sources of the reflection member and each protrusion is triangular in cross section when it is cut by a plane perpendicular to the direction of extension of the plurality of light sources.

18 Claims, 12 Drawing Sheets

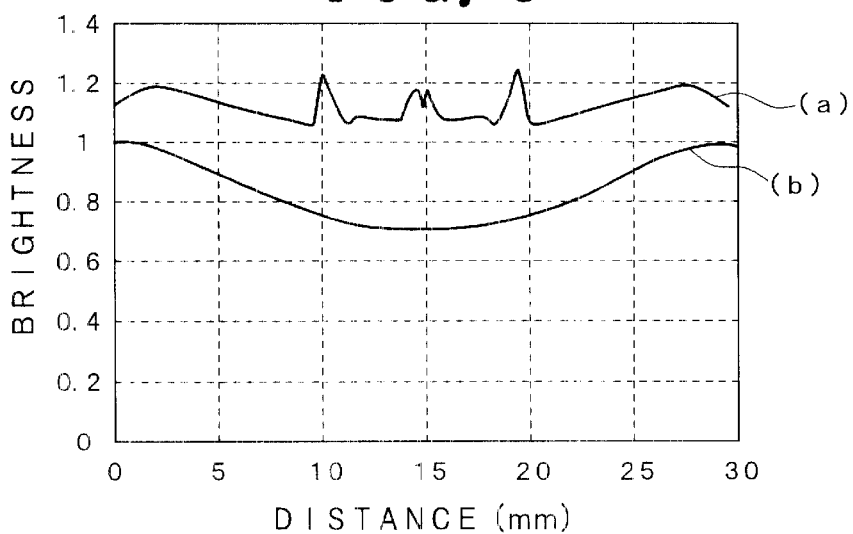
FIG. 5
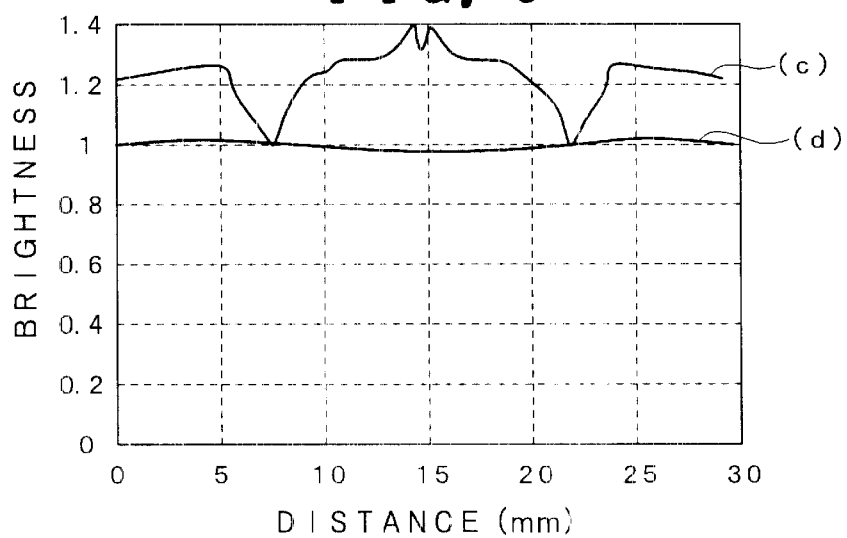
FIG. 6
FIG. 7
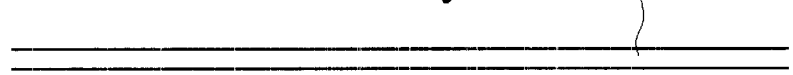
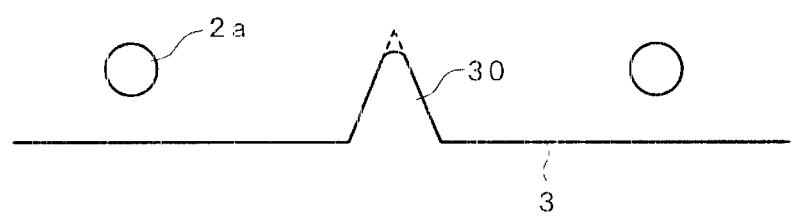

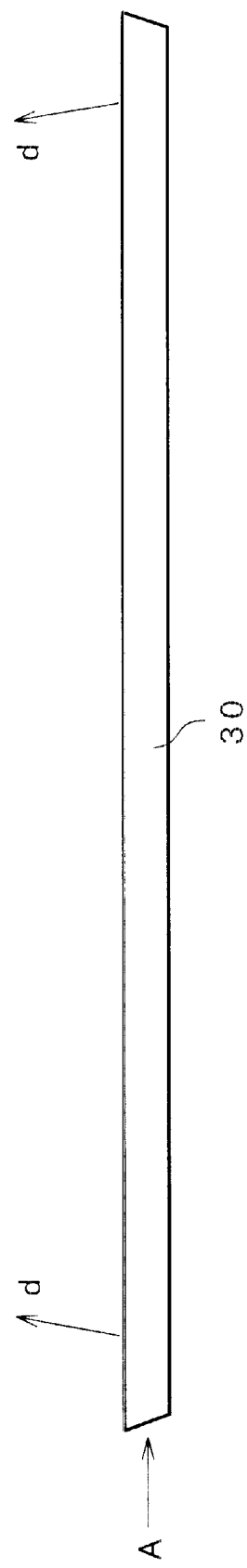
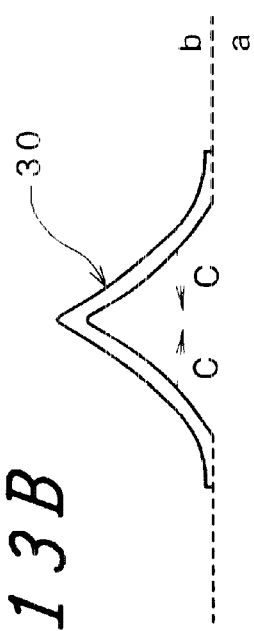
FIG. 13A
FIG. 13B

LIQUID CRYSTAL DISPLAY DEVICE

BACKGROUND OF THE INVENTION

1. Field of the Invention

The present invention relates to a liquid crystal display device used for a personal computer, a work station or the like and in particular to a technology effectively applied to a direct backlight unit used for the liquid crystal display device.

2. Description of the Related Art

A liquid crystal display module of a super twisted nematic type (hereinafter referred to as STN type) or a thin film transistor type (hereinafter referred to as TFT type) is widely used as a display device for a notebook personal computer and the like.

This liquid crystal display module is formed of a liquid crystal display panel having drain drivers and gate drivers arranged at the periphery and a backlight unit for applying light to the liquid crystal display panel.

This backlight unit is broadly classified into a side backlight unit and a direct backlight unit.

In the case of the liquid crystal display module used for a display device of a liquid crystal display module of a notebook personal computer, a side backlight is generally employed.

In recent years, the liquid crystal display module has been enlarged in size or in screen and has been used as a display device of a monitor. For the liquid crystal display module for such a large size or large screen monitor, a direct backlight unit is suitable because it can produce high luminance.

In this connection, the liquid crystal display module employing the direct backlight unit is disclosed, for example, in Japanese Unexamined Patent Publication No. 5-257141.

The direct backlight unit has a plurality of light sources (cold cathode fluorescent lamps), an optical member including a diffusion plate which light emitted from the plurality of light sources enters, and a reflector having a reflecting surface for reflecting light, radiated from the plurality of light sources to the side opposite to a liquid crystal display panel, to the side of the liquid crystal display panel.

On the other hand, in recent years, in a liquid crystal display module for a large screen monitor, the need for reducing thickness and picture frame width is increasing, as is the case with the liquid crystal display module for a notebook personal computer.

However, if the direct backlight unit is reduced in thickness, that is, the distance between the optical member and the reflector is reduced so as to reduce the thickness of the liquid crystal display module for a large screen monitor, of the light emitted from the respective light sources, the amount of light entering the region between the respective light sources of the optical member is decreased.

For this reason, there is presented the problem that the luminance in the region between the respective light sources on the surface of the liquid crystal display panel decreases as compared with the luminance in the region right above the respective light sources on the surface of the liquid crystal display panel to cause an unevenness in the luminance on the display surface of the liquid crystal display panel.

In order to solve the above problem and to make the luminance on the display surface of the liquid crystal display panel uniform, it is necessary to use a light curtain (for example, printing a dotted pattern on the diffusion panel of the optical member). However, since the light curtain makes the luminance uniform by reducing peak luminance, it has a drawback of reducing the luminance.

Further, the light curtain also has a drawback incapable of making the luminance sufficiently uniform because of variations in manufacture such as variations in accuracy in the alignment of the respective light sources and the respective dotted patterns constituting the light curtain.

The invention has been made to solve the above problems of the conventional technology. The object of the present invention is to provide a technology capable of reducing an unevenness in luminance caused on the display surface of a liquid crystal display element in a liquid crystal display device employing a direct backlight unit.

The above-mentioned object and the other objects and new features of the invention will be made clear by the description and the accompanying drawings of the specification.

SUMMARY OF THE INVENTION

Among the inventions disclosed in the present application, the outline of the typical inventions will be described in brief in the following.

That is, the invention is a liquid crystal display device having: a liquid crystal display element having two substrates opposed to each other and a liquid crystal layer sandwiched between the two substrates; a plurality of light sources disposed opposite to the display surface of the liquid crystal display element and radiating light to the liquid crystal display element; optical members interposed between the liquid crystal display element and the plurality of light sources; and a reflection member disposed opposite to the liquid crystal display element of the plurality of light sources, and is characterized in that the reflection member has, in the regions between the plurality of light sources, protrusions protruding to the plurality of light sources and arranged along the direction of extension of the plurality of light sources, and that the protrusion is triangular in cross section when it is cut by a plane perpendicular to the direction of extension of the plurality of light sources, and that assuming that the distance between the center portions of the plurality of light sources is L, the distance between the reflection member and the center portions of the plurality of light sources being d1, the height of the protrusion being h, and an angle formed by two sides of the protrusion protruding to the plurality of light sources being θ, these factors satisfies the following relations $$h \geq d1,\ \tan^{-1}(2(h+d1))/L \geq 90°-\theta.$$

In the preferable embodiment in accordance with the present invention, the above-mentioned protrusion has a cross section shaped like an isosceles triangle in which two sides of the protrusion protruding to the plurality of light sources are equal.

In the preferable embodiment in accordance with the invention, the above-mentioned protrusion has a cross section shaped like a triangle having a round corner at a vertex.

In the preferable embodiment in accordance with the invention, the vertex where the two sides of the protrusion protruding to the plurality of light sources cross each other is in the middle portion between the center portions of the plurality of light sources.

In the preferable embodiment in accordance with the invention, assuming that the distance between the reflection member and the optical member is D, the distance D satisfies the following relation 10 mm<*D*<20 mm In the preferable embodiment in accordance with the invention, the optical member includes a diffusion plate on which patterns for making luminance uniform are printed.

In the preferable embodiment in accordance with the invention, the above-mentioned protrusion has means for preventing deformation.

In the preferable embodiment in accordance with the invention, the means for preventing deformation are a plurality of thin plates disposed between two sides of the protrusion protruding to the plurality of light sources in the direction perpendicular to the direction of extension of the plurality of light sources.

In the preferable embodiment in accordance with the invention, the means for preventing deformation is a notch made at the vertex where two sides of the protrusion protruding to the plurality of light sources cross each other.

In the preferable embodiment in accordance with the invention, the reflection member is made of synthetic resin.

According to the means described above, the protrusions for reflection, each of which is triangular in cross section, are provided in the regions between the respective light sources of the reflection member in the direct backlight unit and effectively reflect light radiated from the respective light sources to the regions between the respective light sources of the optical member. Therefore, it is possible to reduce unevenness in luminance produced on the display surface of the liquid crystal display element as compared with the conventional liquid crystal display device.

Further, since the protrusion triangular in cross section is provided with the means for preventing deformation, it is possible to prevent the deformation of the reflection member and to enhance the strength thereof.

BRIEF DESCRIPTION OF THE DRAWINGS

FIG. 5 is a graph to show one example of a luminance distribution on a liquid crystal display panel determined by calculation;

FIG. 6 is a graph to show another example of a luminance distribution on a liquid crystal display panel determined by calculation;

FIG. 7 is an illustration to show a variety of the protrusion of the embodiment 1 in accordance with the invention;

FIG. 11A is a plan view of a reflector 3 when viewed from a cold cathode fluorescent lamp side, FIG. 11B is a cross-sectional view taken on a line A-A' in FIG. 11A, and FIG. 11C is a plan view of the reflector 3 when viewed from the side opposite to the cold cathode fluorescent lamp 2;

FIG. 12A is a side view of a protrusion 30 when viewed from the side, FIG. 12B is a bottom plan view of the protrusion 30 when viewed from the side opposite to the cold cathode fluorescent lamp 2, and FIG. 12C is a front view of the protrusion 30 when viewed from the direction of B in FIG. 12A;

FIG. 13A to FIG. 13B show only a protrusion of a reflector of an embodiment 1 in accordance with the invention, FIG. 13A is a side view of a protrusion 30 when viewed from the side, and FIG. 13B is a front view of the protrusion 30 when viewed from the direction of A in FIG. 13A; FIG. 14A is a side view of a protrusion 30 when viewed from the side, FIG. 14B is a plan view of the protrusion 30 when viewed from the side opposite to the cold cathode fluorescent lamp 2, and FIG. 14C is a front view of the protrusion 30 when viewed from the direction of C in FIG. 14A.

DETAILED DESCRIPTION

Figure 1:
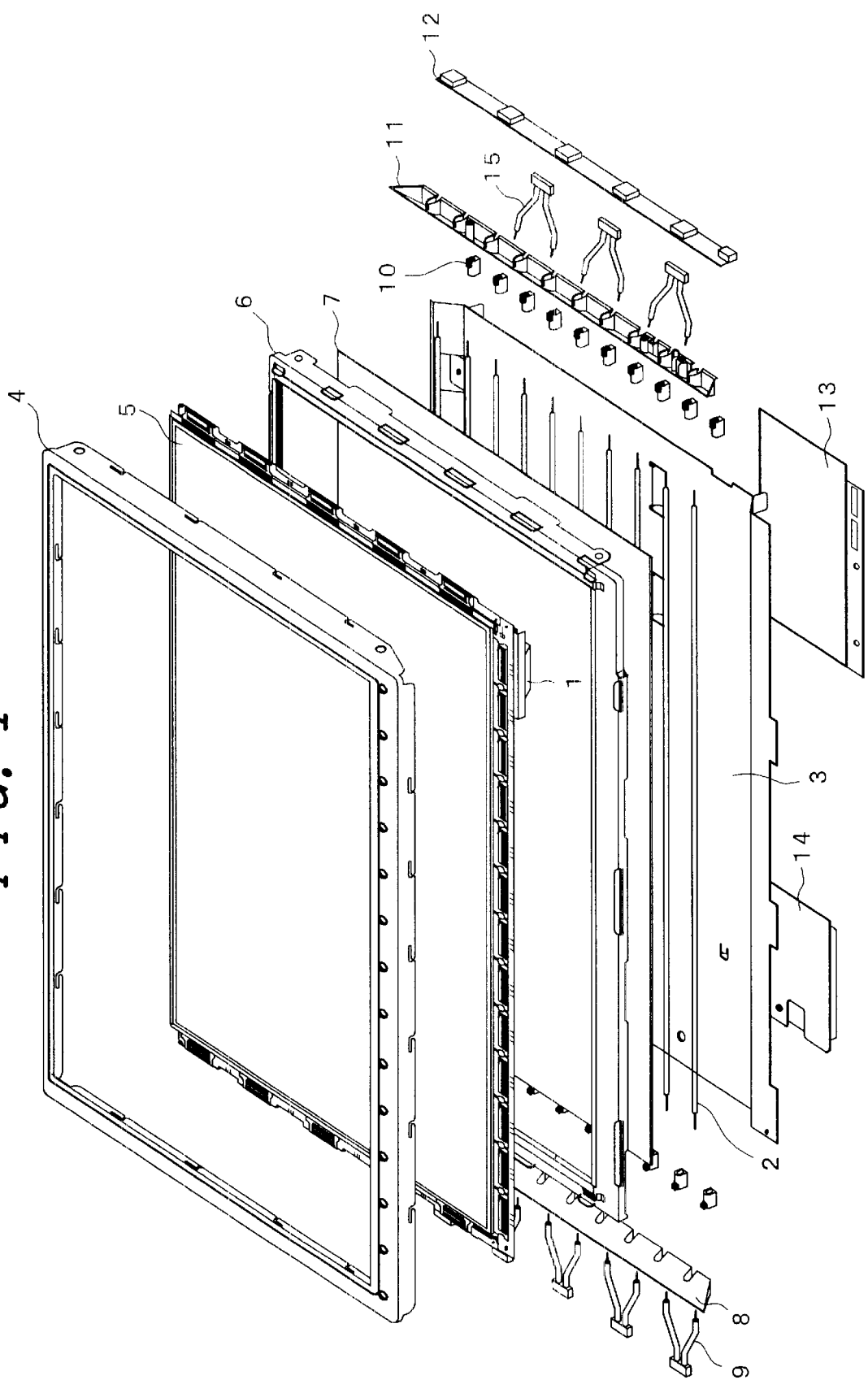
FIG. 1 is an exploded view, in perspective, to show the schematic constitution of a TFT type liquid crystal display module (LCM) of an embodiment 1 in accordance with the invention.

The present embodiments in accordance with the invention will be described in detail with reference to the accompanying drawings.

Here, throughout all the drawings to show the embodiments, parts having the same functions are denoted by the same reference characters and their description will not be repeated.

<<Embodiment 1>>
<The Basic Constitution of a TFT Type Liquid Crystal Display Module of the Present Embodiment>

FIG. 1 is an exploded view, in perspective, to show the schematic constitution of a TFT type liquid crystal display module (hereinafter referred to as LCM) of the present embodiment. The LCM of the present embodiment includes a frame-shaped upper frame 4 made of a metal plate, a liquid crystal panel (hereinafter referred to as LCD; a liquid crystal display element in accordance with the invention) 5 and a direct backlight unit.

The liquid crystal display panel 5 is formed as follows: a TFT substrate, on which pixel electrodes, thin film transistors and the like are formed, is overlaid on a filter substrate, on which opposed electrodes, color filters and the like are formed, with a predetermined gap therebetween; both the substrates are bonded to each other with a sealing member provided in the shape of a frame between the peripheral portions of both the substrates; liquid crystal is filled into a space inside the sealing member from an opening, which is made in a part of the sealing member, and then the opening is sealed; and a polarizing plate is placed on the outside of both the substrates.

Here, on the glass substrate of the TFT substrate are mounted a plurality of drain drivers and gate drivers each of which is constituted by a semiconductor integrated circuit. A drive power source, display data and a control signal are supplied to these drain drivers via a flexible printed wiring board 1 and the drive power source and the control signal are supplied to the gate drivers via the flexible printed wiring board 1. The flexible printed wiring board 1 is connected to a drive circuit board (TCON board) 13 provided on the back side of the backlight unit.

In the backlight unit of the liquid crystal display module of the present embodiment, a plurality of cold cathode fluorescent lamps (CFL) 2 and an optical member (diffusion sheet, lens sheet) 7 are arranged in the order shown in FIG. 1 between a frame-shaped middle frame 6 made of a metal plate and a reflector (reflecting member of the invention) 3.

In this connection, in FIG. 1, reference characters 8, 11 designate members for holding the cold cathode fluorescent lamps. A reference character 9 designates a high voltage side cable connector. A reference character 10 designates a rubber bush. A reference character 12 designates a low voltage side connector. A reference character 14 designates an inverter circuit board for driving the cold cathode fluorescent lamps 2. A reference character 15 designates a low voltage side cable connector.

In the present embodiment, the reflector 3 has a white or silver inside surface and is formed of a metal plate or a synthetic resin and functions also as a bottom frame.

<Constitution of a Conventional Direct Backlight Unit>

Figure 8:
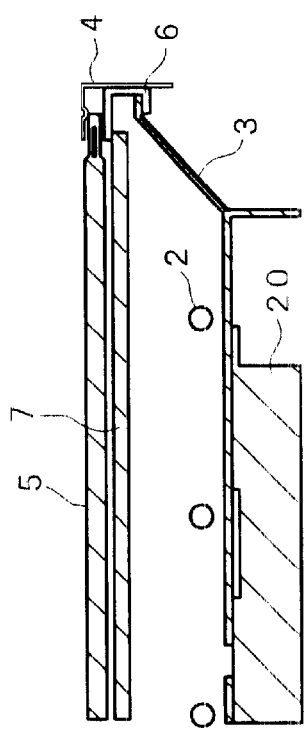
FIG. 8 is a cross-sectional view to show a main sectional structure of a liquid crystal display module employing a conventional direct backlight unit.
Figure 8:
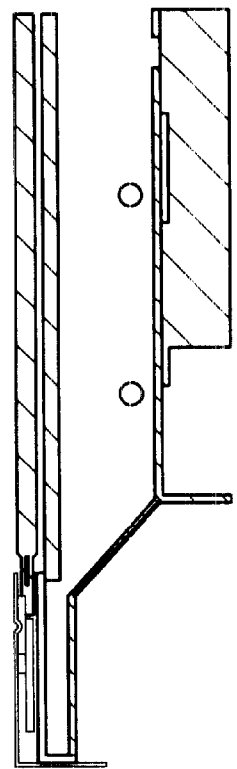

FIG. 8 is a cross-sectional view to show a main sectional structure of a liquid crystal display panel employing a conventional direct backlight unit.

Here, FIG. 8 is a view to show a cross-sectional structure cut by a plane perpendicular to the direction of extension of the cold cathode fluorescent lamps 2. In FIG. 8, a reference character 20 designates a casing for protecting circuit boards (drive circuit board 13, inverter circuit board 14) mounted on the bottom of the reflector 3.

As shown in FIG. 8, in the conventional direct backlight unit, the surface of the reflector 3 is formed in a flat plane.

Figure 9:
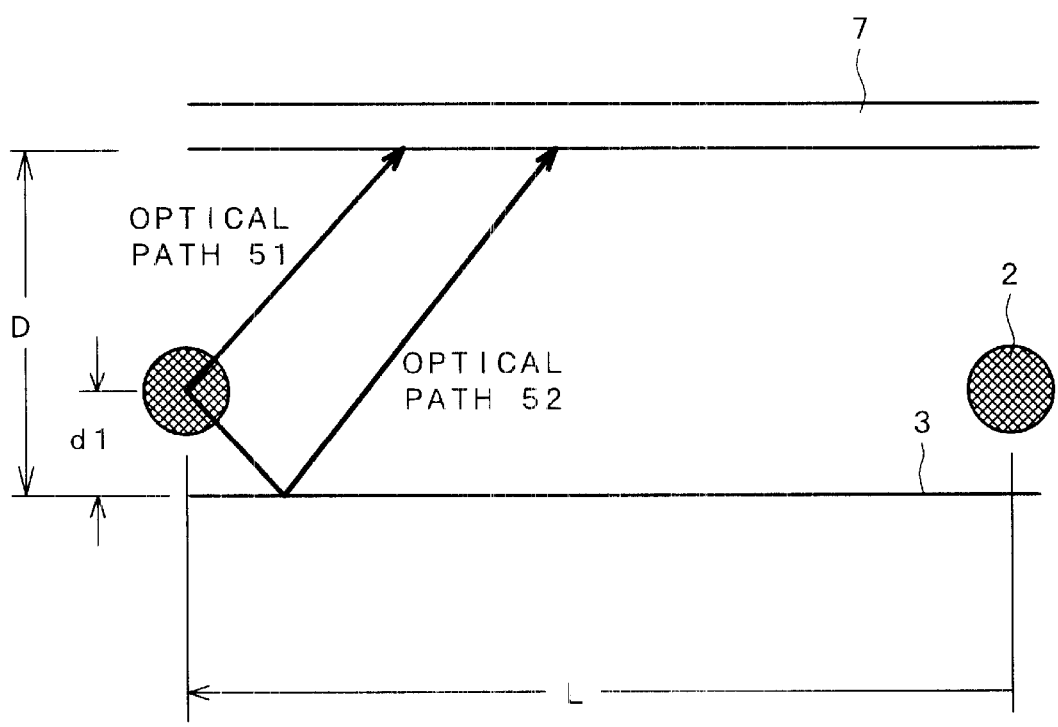
FIG. 9 is an illustration to show the optical path of light emitted from a cold cathode fluorescent lamp 2 in a conventional direct backlight unit.

FIG. 9 is an illustration to show the optical path of light emitted by the cold cathode fluorescent lamp 2 in the conventional direct backlight unit.

As shown in FIG. 9, light emitted from the cold cathode fluorescent lamp 2 to the side of the optical member 7 enters the optical member 7 (more specifically, diffusion plate) via an optical path 51 and light emitted from the cold cathode fluorescent lamp 2 to the side of the reflector 3 enters the optical member 7 via an optical path 52.

As described above, if the direct backlight unit is reduced in thickness, in other words, the distance between the optical member 7 and the reflector 3 (distance D in FIG. 9) is made sufficiently small as compared with the distance L between the centers of the respective fluorescent lamps 2, there is presented the problem that the amount of light entering the region between the respective cold cathode fluorescent lamps 2 of the optical member 7 is reduced by light emitted by the respective cold cathode fluorescent lamps 2 to reduce the luminance in the region between the respective cold cathode fluorescent lamps 2 on the surface of the liquid crystal display panel as compared with the luminance in the region right above the respective cold cathode fluorescent lamps 2 on the surface of the liquid crystal display panel, thereby causing unevenness in the luminance on the display surface of the liquid crystal display panel.

Figure 10:
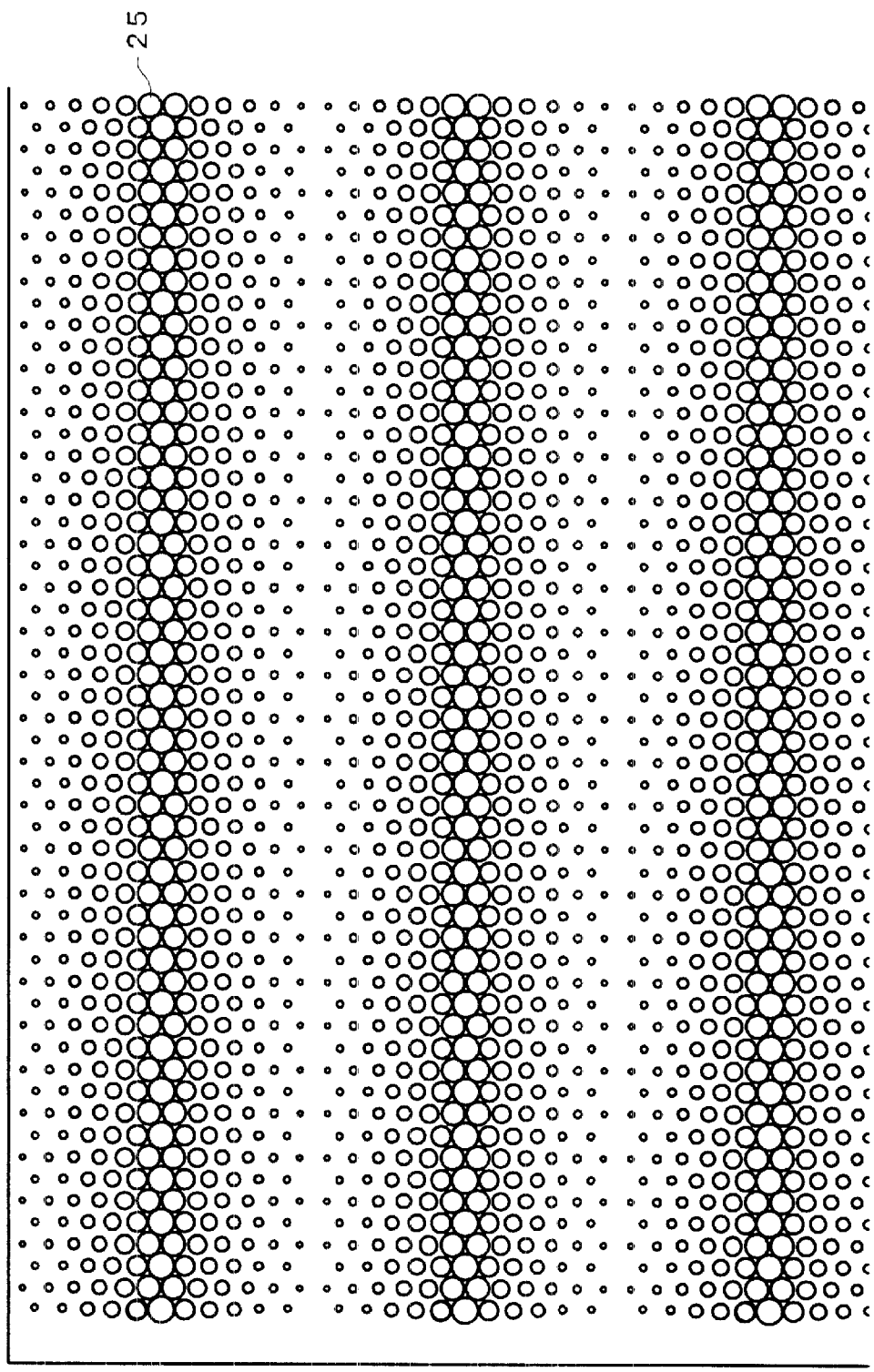
FIG. 10 is an illustration to show one example of a light curtain for adjusting the amount of light.

In order to prevent the problem and to make the luminance on the display surface of the liquid crystal display panel uniform, for example, as shown in FIG. 10, a light curtain for adjusting the amount of light needs to be used, but the light curtain has a drawback of reducing the luminance because it makes the luminance uniform by reducing peak luminance.

The light curtain shown in FIG. 10 is made by printing dotted patterns 25 shown in FIG. 10 on the diffusion plate of the optical member 7.

Further, this light curtain also presents the problem that the luminance is not made sufficiently uniform because of variations in manufacture such as variations in the accuracy of the alignment of the respective cold cathode fluorescent lamps 2 with the respective dotted patterns constituting the light curtain.

<Distinctive Constitution of a Direct Backlight Unit of the Present Embodiment>

Figure 2:
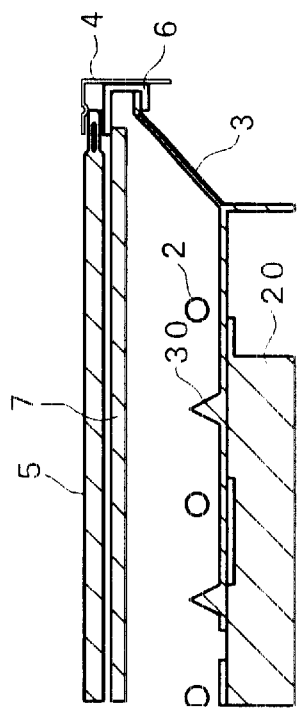
FIG. 2 is a cross-sectional view to show a main sectional structure of a liquid crystal display module employing a direct backlight unit of an embodiment 1 in accordance with the invention.
Figure 2:
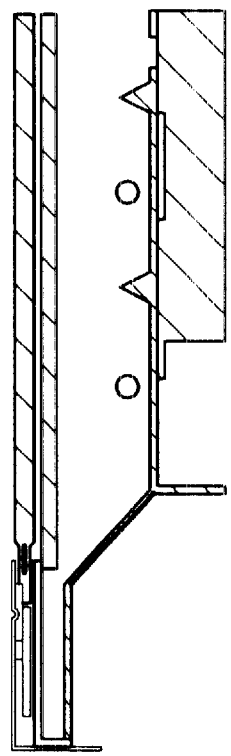

FIG. 2 is a cross-sectional view to show a main cross-sectional structure of a liquid crystal display module employing a direct backlight unit of the present embodiment.

Here, FIG. 2 is a view to show a cross-sectional structure cut by a plane perpendicular to the extension of the cold cathode fluorescent lamp 2.

As shown in FIG. 2, in the present embodiment, in the region between the cold cathode fluorescent lamps 2 of the reflector 3 are provided protrusions 30 for reflection each of which is protruded to the side of the plurality of cold cathode fluorescent lamps 2 and is arranged along the direction of extension of the plurality of cold cathode fluorescent lamps 2 and is formed in the shape of a triangle in a cross section when cut by a plane perpendicular to the extension of the plurality of cold cathode fluorescent lamps 2 (hereinafter simply referred to as cross section).

Figure 3:
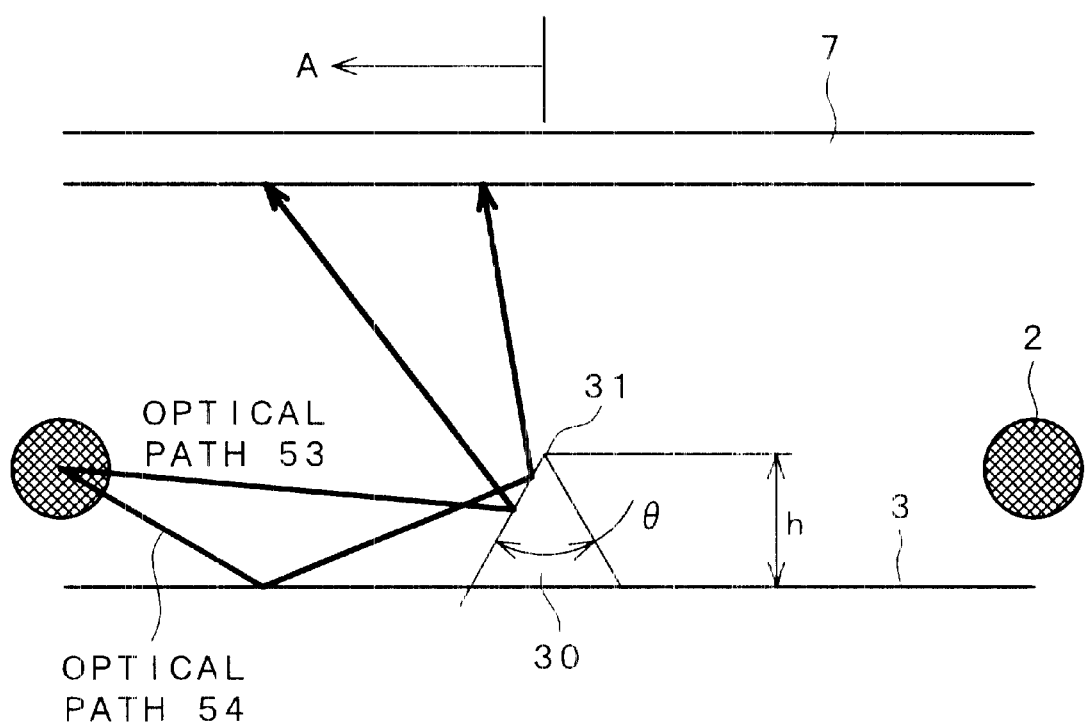
FIG. 3 is an illustration to show the optical path of light emitted from a cold cathode fluorescent lamp in a direct backlight unit of an embodiment 1 in accordance with the invention.

FIG. 3 is an illustration to show the optical path of light emitted from the cold cathode fluorescent lamp 2 in a direct backlight unit of the present embodiment.

As shown in FIG. 3, also in the present embodiment, light emitted from the cold cathode fluorescent lamp 2 to the side of the optical member 7 enters the optical member 7 (more specifically, diffusion plate), but part of light emitted from the cold cathode fluorescent lamp 2 to the side of the reflector 3, as shown by optical paths 53, 54, is reflected by the reflector 3 and the protrusion 30 and enters the optical member 7.

The light entering the optical member 7 via the optical paths 53, 54 enters a region (region shown by an arrow A in FIG. 3) nearer to the cold cathode fluorescent lamp 2, which radiates light to be reflected by the protrusion 30, than the center portion between the respective cold cathode fluorescent lamps 2. Therefore, it is possible to improve luminance on the whole surface of the liquid crystal display panel.

In particular, it is possible to improve the luminance between the respective cold cathode fluorescent lamps on the surface of the liquid crystal display panel.

Therefore, even if the direct backlight unit is reduced in thickness in order to make the thickness of the liquid crystal display module for a large screen monitor, that is, the distance between the optical member 7 and the reflector 3 (distance D in FIG. 9) is made sufficiently small as compared with the distance L between the center portions of the respective cold cathode fluorescent lamps 2, it is possible to improve the luminance between the respective cold cathode fluorescent lamps 2 on the surface of the liquid crystal display module and thus to make the luminance on the surface of the liquid crystal display module uniform. Therefore, it is possible to prevent unevenness in luminance from being produced on the display surface of the liquid crystal display panel.

In this connection, in order to effectively produce the above-mentioned effect, it is preferable that the vertex 31 of the protrusion 30 is arranged at the center of the neighboring cold cathode fluorescent lamps 2 of the reflector 3.

The height of the protrusion 30 and the angle θ of the vertex of the protrusion 30 will be hereinafter described by the use of FIG. 4.

Figure 4:
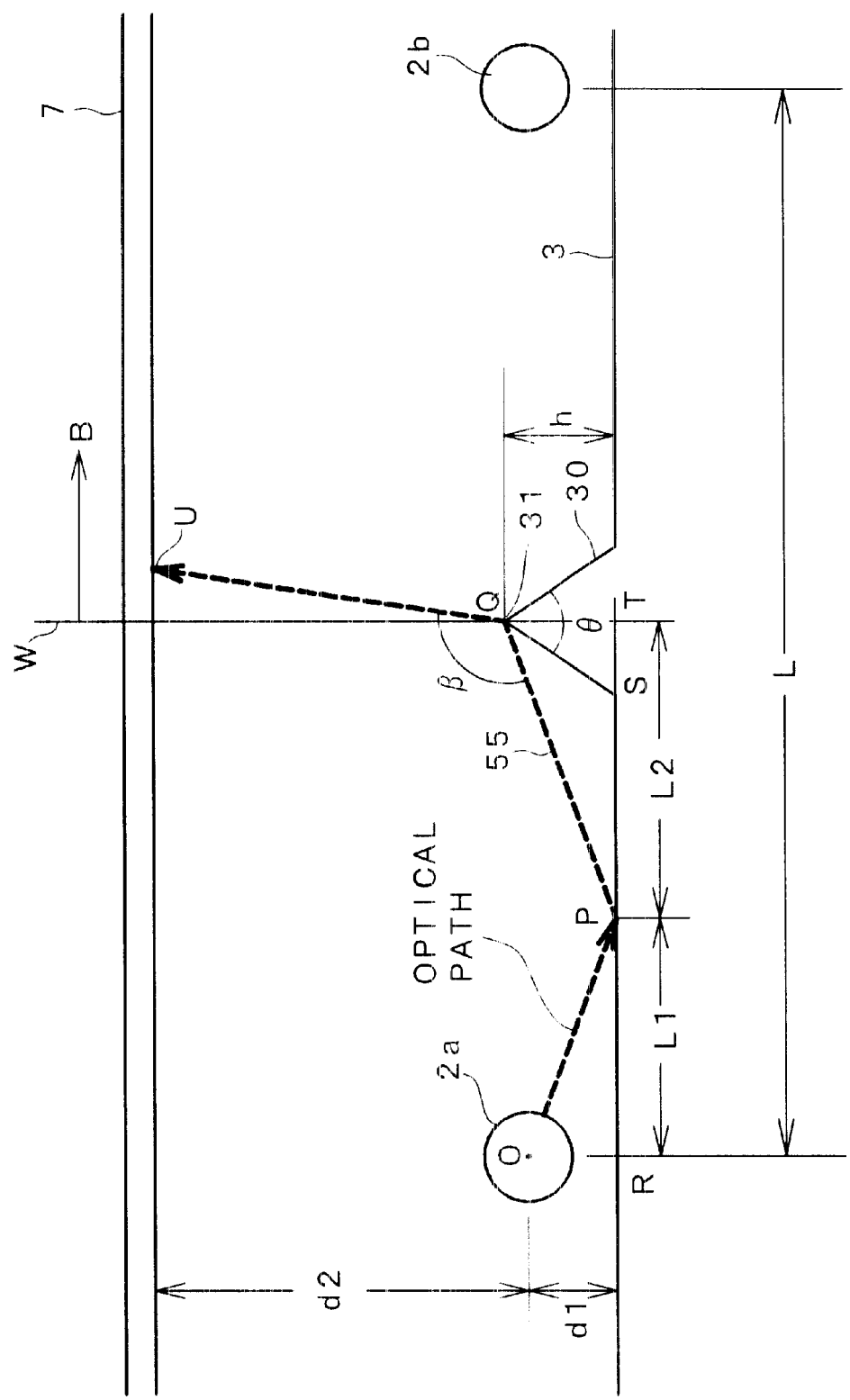
FIG. 4 is an illustration to show the height of a protrusion and the angle θ of a vertex of the protrusion of an embodiment 1 in accordance with the invention.

Here, as shown in FIG. 4, assume that the distance between the center portion of the cold cathode fluorescent lamp 2a and the center portion of the cold cathode fluorescent lamp 2b is L and that the distance between the center portion of the cold cathode fluorescent lamps 2a, 2b and the reflector 3 is d1. Further, assume that the cross section of the protrusion 30 is an isosceles triangle formed by two equal sides protruding to the sides of the cold cathode fluorescent lamps 2a, 2b and having a vertex 31 having an angle θ and a height of h.

Further, for the sake of convenience, assume that points are denoted as follows by the reference characters: the center portion of the cold cathode fluorescent lamp 2a is O; a point of intersection of a vertical line passing the center portion of the cold cathode fluorescent lamp 2a and perpendicular to the reflector 3 and the reflector 3 is R; a point where the optical path 55 of light emitted from the cold cathode fluorescent lamp 2a is reflected by the reflector 3 is P; the vertex 31 of the protrusion 30 is Q; a point where the protrusion 30 rises is S; a point of intersection of a vertical line W passing the vertex 31 of the protrusion 30 and perpendicular to the reflector 3 and the extension line of the reflector 3 is T; and a point where light enters the optical member 7 via the optical path 55 is U.

In order to produce the above-mentioned effect, it is recommended that, of the light emitted from the cold cathode fluorescent lamp 2a, light which is once reflected by the reflector 3 at the point P and then is reflected by the protrusion 30 at the vertex 31 (light shown by the optical path 55 in FIG. 4) enters the side of the cold cathode fluorescent lamp 2b (B side shown by an arrow in FIG. 4) with respect to the vertical line W of the optical member 7.

Expressing this relation by mathematical equations, the following equations (1), (2) are given, $$h \geq d1 \tag{1}$$

$$\angle SQT + \angle PQS + \angle UQP \geq 180° \tag{2}$$

where assuming that ∠OPR is α, the ∠SQT, ∠PQS, and ∠UQP are expressed by the following equations (3)

$$\angle SQT = \theta/2$$

$$\angle PQS = 90° - \alpha - \theta/2$$

$$\angle UQP = \theta + 2\alpha \tag{3}$$

Therefore, the above equation (2) is expressed by the following equation (4)

$$\theta/2 + (90° - \alpha - \theta/2) + (\theta + 2\alpha) = 90° + \theta + \alpha \tag{4}$$

$$\theta + \alpha \geq 90°$$

$$\alpha \geq 90° - \theta$$

Further, there is the relationship shown by the following equation (5) between α and d1 and between α and h $$\tan \alpha = d1/L1$$

$$\tan \alpha = h/L2 \tag{5}$$

Here, L1 designates the distance between the point R and the point P and L2 designates the distance between the point P and the point T and there is a relationship shown by the following equation (6) between these distance $$L1 + L2 = L/2 \tag{6}$$

Substituting the equation (5) into the equation (6) yields the following equation (7)

$$(d1 + h)/\tan \alpha = L/2$$

$$\tan \alpha = 2(d1 + h)/L \tag{7}$$

Therefore, the above equation (4) is expressed by the following equation (8)

$$\tan^{-1}(2(d1 + h)/L) \geq 90° - \theta \tag{8}$$

In the case where the above equations (1) and (8) are satisfied in this manner, the above-mentioned effect can be produced.

In other words, in the case where the direct backlight unit is reduced in thickness so as to reduce the thickness of the liquid crystal display module for a large screen monitor, it is possible to improve the luminance in the region between the respective cold cathode fluorescent lamps on the surface of the liquid crystal display panel and thus to make the luminance on the surface of the liquid crystal display panel uniform and to prevent unevenness in luminance from being produced on the display surface of the liquid crystal display panel.

One example of a luminance distribution on the liquid crystal display panel determined by calculation in the present embodiment will be shown in FIG. 5.

In FIG. 5, a horizontal axis (x) designates the distance between the neighboring cold cathode fluorescent lamps 2 and a vertical axis designates relative luminance at the respective positions between the neighboring cold cathode fluorescent lamps 2 in the case where luminance right above the respective cold cathode fluorescent lamps 2 is set at 1.

Here, the conditions of a calculation model in FIG. 5 are as follows.

(1) The number of the cold cathode fluorescent lamps 2 is two.
(2) The reflectivity of the reflector 3 and the reflectivity of the protrusion 30 are both 90%, and the angle of incidence of entering light is equal to the angle of output at the reflector 3 and the protrusion 30.
(3) The distance L between the center portions of the cold cathode fluorescent lamps 2 is 29.5 mm.
(4) The distance D between the reflector 3 and the optical member 7 is 12 mm.
(5) The tube radius r1 of the cold cathode fluorescent lamp 2 is 3 mm.
(6) The distance d1 between the center portion of the cold cathode fluorescent lamp 2 and the reflector 3 is 3.5 mm.
(7) The protrusion 30 has a cross section of an isosceles triangle in which height h is 4 mm and the angle θ of the vertex 31 is 64°.
(8) The cold cathode fluorescent lamp 2 emits light uniformly in all directions from the surface of the cold cathode fluorescent lamp 2.

Further, in FIG. 5, (a) shows the luminance distribution of the liquid crystal display module of the present embodiment and (b) shows the luminance distribution of the conventional liquid crystal display module.

As can be seen from the FIG. 5, as compared with the luminance distribution of the conventional liquid crystal display module shown by (b), in the luminance distribution of the liquid crystal display module of the present embodiment shown by (a), the luminance on the whole surface of the liquid crystal display panel is improved and, in particular, the luminance in the region between the cold cathode fluorescent lamp 2 on the surface of the liquid crystal display panel is improved.

Here, in the graph shown by (a) are produced portions having bright luminance. This is because the optical path 53 and the optical path 54 overlap one another at the portions and, in actuality, light is diffused by the diffusion plate of the reflector 3 and the optical member 7 to reduce the peak of luminance.

A decease in luminance near the portions X=0 and X=29.5 is ascribed to the fact that calculation is performed for two cold cathode fluorescent lamps 2. In actuality, a dip in luminance is reduced by the reflection of the protrusions 30 disposed at x=−14.75 and x=44.25.

Further, the invention can particularly produce effect in the case where the distance D between the reflector 3 and the optical member 7 ranges from 10 mm to 20 mm.

The direct backlight unit in which the distance D between the reflector 3 and the optical member 7 is not less than 20 mm, as shown in FIG. 6(c), has a dip in luminance near the portions x=7 and x=22 and hence can not improve luminance at the portions.

As compared with the luminance distribution of the conventional liquid crystal display module, shown in FIG. 6(d), it is possible to improve the average luminance but it is impossible to produce an effect of improving luminance because there remains portions where luminance can not be improved.

Further, in the direct backlight unit in which the distance D between the reflector 3 and the optical member 7 is not more than 10 mm, luminance can be improved in the whole region but peak luminance is increased. Therefore, means for making luminance uniform, for example, a light curtain shown in FIG. 10, is necessary.

In this connection, FIG. 6 is a graph to show another example of the luminance distribution on the liquid crystal panel determined by calculation. In the graph shown in FIG. 6, the calculation model is the same as the calculation model shown in FIG. 5 except that the distance D between the reflector 3 and the optical member 7 is 20 mm.

As described above, in the present embodiment, in the direct backlight unit, the protrusions 30 for reflection, each of which is triangular in the cross section, are provided between the respective cold cathode fluorescent lamps of the reflector 3 to effectively reflect light emitted from the respective cold cathode fluorescent lamps to the regions between the respective cold cathode fluorescent lamps of the optical member 7. Therefore, it is possible to reduce unevenness in luminance produced on the display surface of the liquid crystal display panel as compared with the conventional liquid crystal display device.

In this connection, a technology in which middle reflection bodies each having a triangular cross section are disposed between the respective cold cathode fluorescent lamps of the reflector in the direct backlight unit is disclosed, for example, in Japanese Unexamined Patent Publication No. 6-27463 (hereinafter referred to as a literature).

However, in this literature, the height of the middle reflection body is considered but, unlike the present embodiment, the angle θ of the vertex of the protrusion is not considered and further, in the technology disclosed in this literature, the middle reflection bodies are not provided so as to reduce the thickness of the liquid crystal display device (that is, so as to reduce the thickness of the direct backlight unit).

Here, in the present embodiment, as shown in FIG. 7, the vertex 31 of the protrusion 30 may have a round corner.

In this cross section, it is possible to diffuse the amount of light entering the portions where the optical path 53 and the optical path 54 shown in FIG. 3 overlap one another to the left and right sides and thus to reduce peak luminance.

Further, as described above, in the present embodiment, the light curtain may be used to reduce peaks in the luminance distribution.

In the present embodiment, the luminance on the display surface of the liquid crystal display panel is improved as a whole and further the gradient of luminance on the display surface of the liquid crystal display panel is reduced as compared with the conventional one. Therefore, even if the light curtain is used to reduce the peaks in the luminance distribution, it is possible to improve the luminance on the display surface of the liquid crystal display panel.

Figure 11A:
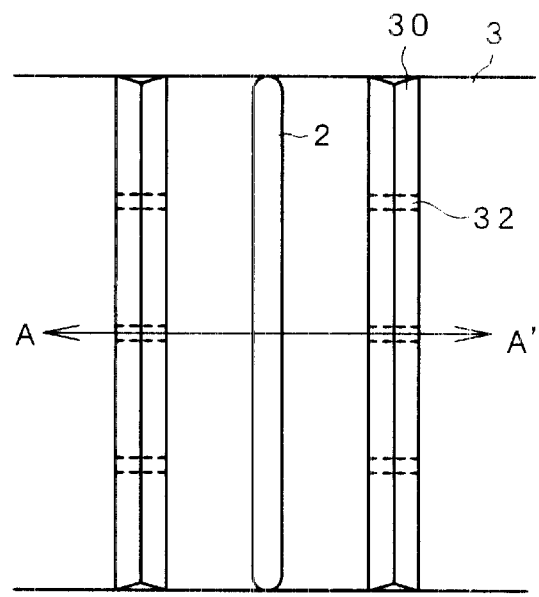
FIG. 11A to FIG. 11C show a schematic constitution of a reflector of a backlight unit of an embodiment 2 in accordance with the invention.
Figure 11B:
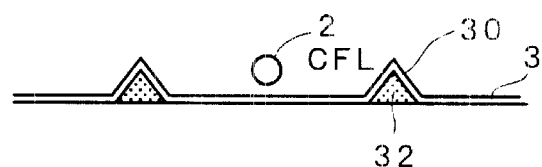
Figure 11C:
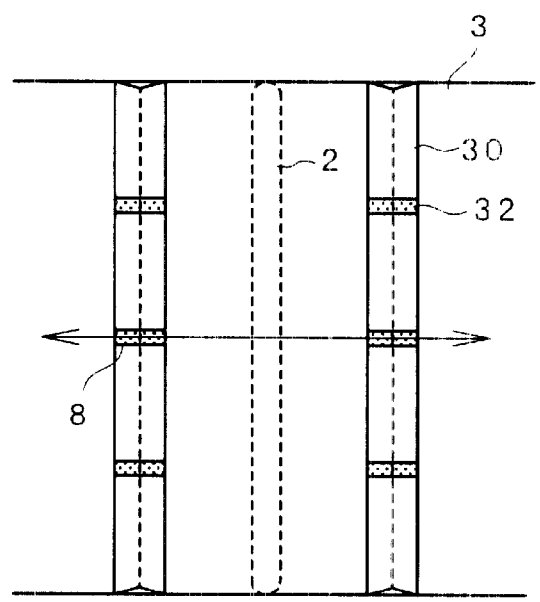

<<Embodiment 2>>
<Distinctive Constitution of a Direct Backlight Unit of the Present Embodiment>FIG. 11A to FIG. 11C show the constitution of the reflector 3 of the backlight unit of an embodiment 2 in accordance with the invention. FIG. 11A is a front plan view of the reflector 3 when viewed from the cold cathode fluorescent lamp 2 side. FIG. 11B is a sectional view of a main portion taken on a line A–A' in FIG. 11A. FIG. 11C is a bottom plan view of the reflector 3 when viewed from the side opposite to the cold cathode fluorescent lamp 2.

Figure 12A:
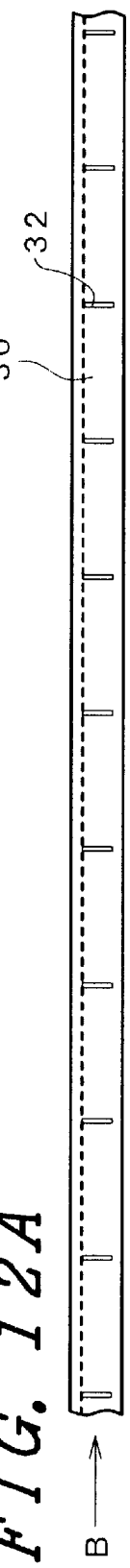
FIG. 12A to FIG. 12C show only a protrusion of a reflector of an embodiment 2 in accordance with the invention.
Figure 12B:
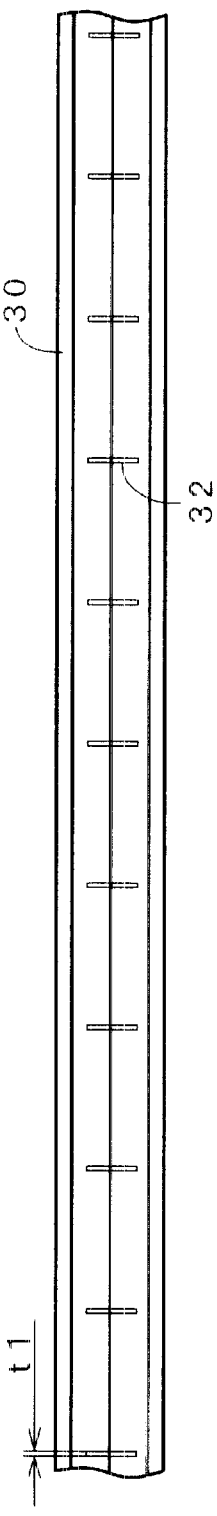
Figure 12C:
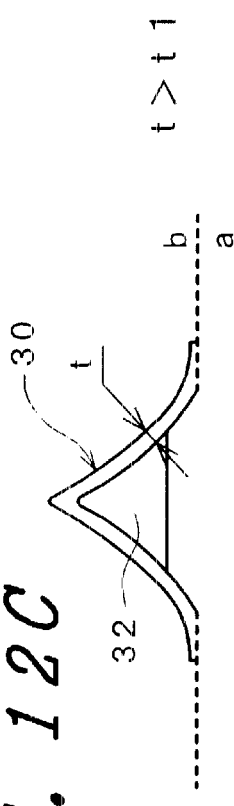

FIG. 12A to FIG. 12C show only the protrusion 30 of the reflector 3 of the present embodiment. FIG. 12A is a side view of the protrusion 30 when viewed from the side. FIG. 12B is a bottom plan view of the protrusion 30 when viewed from the side opposite to the cold cathode fluorescent lamp 2. FIG. 12C is a front view of the protrusion 30 when viewed from the direction of B in FIG. 12A.

As shown in FIG. 11A to FIG. 11C and FIG. 12A to FIG. 12C, in the present embodiment, a plurality of thin plates 32 for preventing the reflector 3 and the protrusions 30 from being deformed are formed inside the protrusions 30 provided on the reflector 3 (in a space sandwiched between two sides of the protrusion 30 protruding to the cold cathode fluorescent lamp 2)

FIG. 13A to FIG. 13B show only the protrusion 30 of the reflector 3 of the present embodiment 1. FIG. 13A is a side view of the protrusion 30 when viewed from the side. FIG. 13B is a front view of the protrusion 30 when viewed from the direction of A in FIG. 13A.

The inventors of the present application found the problem that when the above-mentioned reflector 3 and protrusion 30 were formed of synthetic resin (for example, polycarbonate) by an injection molding, they were deformed in the directions of (c) and (d) shown in FIG. 13A and FIG. 13B and thus could not be formed in predetermined tolerances.

This is because the hollow and angular shape of the protrusion 30 and a difference in thickness thereof cause a difference in the degree of shrinkage after the protrusion 30 is formed, thereby deforming the protrusion 30.

That is, the protrusion 30 is formed in the hollow angular shape, as shown in FIG. 13B. Thus, when the protrusion 30 is formed by the injection molding, an angular portion (b) side is cured earlier and (a) side is cured later while it is cooled.

Since a portion at the vertex 31 of the protrusion 30 is thicker than the other portions, the surface of the portion at the vertex 31 of the protrusion 30 is cured earlier and then the inside of the portion at the vertex of the protrusion 30 is cured later. For this reason, the inside of the portion at the vertex of the protrusion 30, which is cured later, is shrank to deform the protrusion 30 in the directions of (c) and (d) shown in FIG. 13A and FIG. 13B.

As described above, in the present embodiment, the plurality of thin plates 32, each having a thickness t1 thinner than the thickness t of the protrusion 30, are provided in the protrusion 30 in the direction perpendicular to the direction of extension of the protrusion 30.

These thin plates 32 can apply reactive forces to the shrinking deformation of the protrusion 30 in the direction of (c) shown in FIG. 13B even if there is a difference in time of cooling and curing between the portions of the protrusion 30 and thus can prevent the shrinking deformation. Further, the plurality of thin plates 32 provided in the protrusion 30 can function as parts resisting to the deformation of the reflector 3 in the direction of (d) shown in FIG. 13.

In this connection, the plurality of thin plates 32 are arranged at intervals of 20 mm, for example, and further the thin plate itself has a thickness which does not produce a strong shrinking force nor make the uneven surface of the protrusion 30.

In this manner, in the present embodiment, when the reflector 3 and the protrusion 30 are formed of synthetic resin by the injection molding, they can be prevented from being deformed and can be formed in the predetermined tolerances.

That is, in the present embodiment, since the protrusion 30 of the reflector 3 can be formed nearly in such as shape as designed, the protrusion 30 can exert functions, such as the reflection and diffusion of light radiated from the cold cathode fluorescent lamp 2, as they are designed and can be assembled with the ease as designed.

Further, in the present embodiment, the plurality of thin plates 32 provided inside the protrusion 30 function as ribs, so they can improve the strength of the reflector 3.

These effects can be produced even if the reflector 3 and the protrusions 30 are made of a metal plate.

<<Embodiment 3>>
<Distinctive Constitution of the Direct Backlight Unit of the Present Embodiment>

Figure 14A:
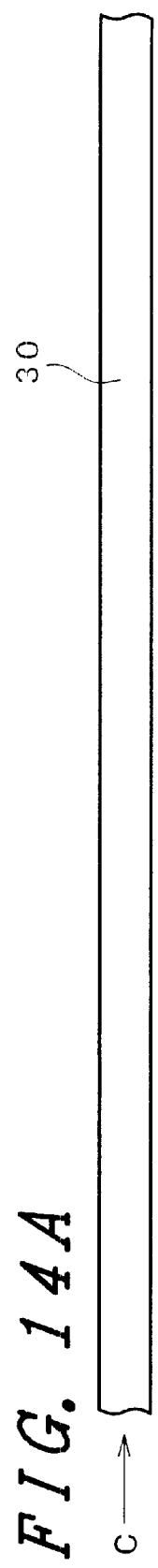
FIG. 14A to FIG. 14C show only a protrusion of a reflector of an embodiment 3 in accordance with the invention.
Figure 14B:
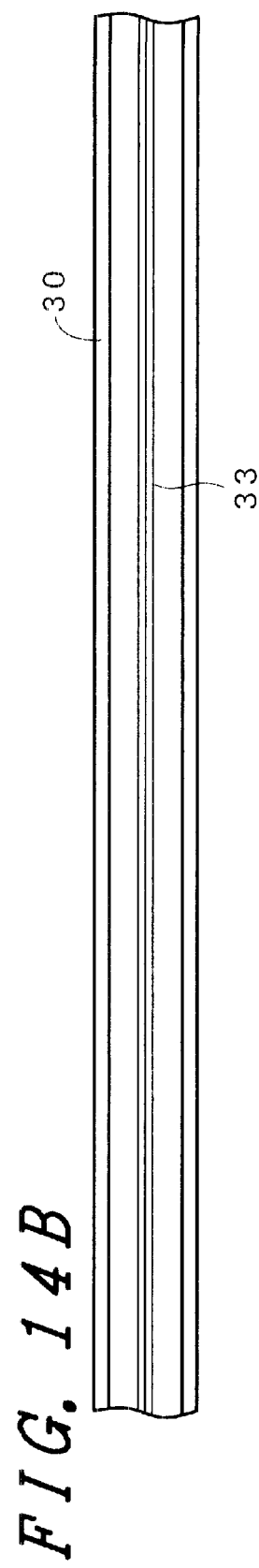
Figure 14C:
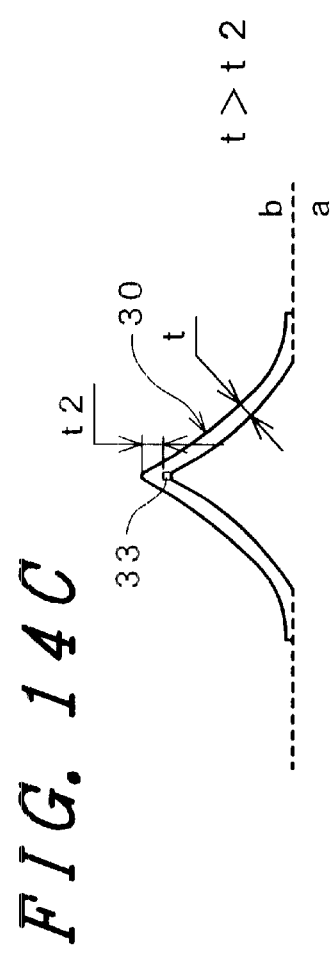

FIG. 14A to FIG. 14C show only the protrusion 30 of the reflector 3 of the present embodiment. FIG. 14A is a side view of the protrusion 30 when viewed from the side. FIG. 14B is a bottom plan view of the protrusion 30 when viewed from the side opposite to the cold cathode fluorescent lamp 2. FIG. 14C is a front view of the protrusion 30 when viewed from the direction of B in FIG. 14A.

As shown in FIG. 14C, in the present embodiment, a notch for preventing the deformation of the reflector 3 and the protrusion 30 is formed inside the portion at the vertex of the protrusion 30 provided on the reflector 3.

Here, the thickness t2 of a portion at the notch 33 is thinner than the thickness t of the protrusion 30.

This makes the direction of shrinkage after formation opposite to the direction of (c) shown in FIG. 13B and thus can prevent the phenomenon that the hollow and angular shape of the protrusion 30 and a difference in thickness thereof cause a difference in the degree of shrinkage after the protrusion 30 is formed, thereby deforming the protrusion 30.

Further, this notch 33 increases the strength in the direction of extension of the protrusion 30 and can prevent the deformation of the protrusion 30.

In this manner, also in the present embodiment, when the reflector 3 and the protrusions 30 are formed of synthetic resin by the injection molding, they can be prevented from being deformed and can be formed in the predetermined tolerances.

That is, in the present embodiment, since the protrusion 30 of the reflector 3 can be formed nearly in the shape as designed, the protrusion 30 can exert functions, such as the reflection and diffusion of light radiated from the cold cathode fluorescent lamp 2, as they are designed and can be assembled with the ease as designed.

Further, in the present embodiment, the notch provided inside the vertex of the protrusion 30 function as a rib, so it can improve the strength of the reflector 3.

These effects can be produced even if the reflector 3 and the protrusions 30 are made of a metal plate.

In this connection, while the cross section of the protrusion 30 is formed in a triangle, whose two sides protruding toward the cold cathode fluorescent lamp 2 are not straight sides but lines curved inside, in the present embodiment and the above-mentioned embodiment 2, even if the cross section of the protrusion 30 is formed in a triangle whose two sides protruding toward the cold cathode fluorescent lamp 2 are formed of straight sides, as is the case with the above-mentioned embodiment 1, the effects described above can be produced.

Further, needless to say, even in the present embodiment and the above-mentioned embodiment 2, the above-mentioned equations (1) and (8) can be satisfied and hence the effects described in the above-mentioned embodiment 1 can be produced.

Still further, while the embodiments in which the invention is applied to a TFT type liquid crystal display module have been mainly described in the above-mentioned embodiments, needless to say, it is not intended to limit the invention to these embodiments but the invention can be applied also to an STN type liquid crystal display module.

Up to this point, while the invention made by the present inventor has been described specifically based on the above-mentioned embodiments, needless to say, it is not intended to limit the invention to the above-mentioned embodiments but the invention can be variously modified within the scope and spirit as claimed in appended claims.

Typical effects produced by the invention disclosed in the present application will be described in brief in the following.

(1) According to the invention, it is possible to reduce unevenness in luminance caused on the display surface of the liquid crystal display element in the liquid crystal display device employing the direct backlight unit.

(2) According to the invention, it is possible to prevent the deformation of the reflection member and to enhance the strength thereof in the liquid crystal display device employing the direct backlight unit.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device formed by the steps of:
preparing a first substrate having a first main surface having a color filter formed thereon;
overlaying a second substrate having a second main surface on the first substrate so that the first main surface is opposed to the second main surface with a gap therebetween and bonding the peripheral portion of the first substrate to the peripheral portion of the second substrate with a sealing material; and
filling a space surrounded by the first main surface, the second main surface, and the sealing material with a liquid crystal material, and comprising:

a liquid crystal display element having two substrates opposed to each other and a liquid crystal layer sandwiched between the two substrates;

a plurality of light sources disposed opposite to the display surface of the liquid crystal display element and radiating light to the liquid crystal display element;

an optical member interposed between the liquid crystal display element and the plurality of light sources; and a reflection member disposed opposite to the liquid crystal display element of the plurality of light sources, characterized in that the reflection member has protrusions protruding to the plurality of light sources and arranged along the direction of extension of the plurality of light sources in the regions between the plurality of light sources, and that the protrusion is triangular in cross section when it is cut by a plane perpendicular to the direction of extension of the plurality of light sources, and that assuming that the distance between the center portions of the plurality of light sources is L, the distance between the reflection member and the center portions of the plurality of light sources being d1, the height of the protrusion being h, and an angle formed by two sides of the protrusion protruding to the plurality of light sources being θ, these factors satisfies the following relations $h \geq d1, \tan^{-1}(2(h+d1))/L \geq 90° - \theta$.

2. A liquid crystal display device as claimed in claim 1, wherein the protrusion has a cross section shaped like an isosceles triangle in which two sides of the protrusion protruding to the plurality of light sources are equal.

3. A liquid crystal display device as claimed in claim 2, wherein the vertex where the two sides of the protrusion protruding to the plurality of light sources cross each other is in the middle portion between the center portions of the plurality of light sources.

4. A liquid crystal display device as claimed in claim 3, wherein assuming that the distance between the reflection member and the optical member is D, the distance D satisfies the following relation 10 mm<D<20 mm.

5. A liquid crystal display device as claimed in claim 3, wherein the optical member includes a diffusion plate on which patterns for making luminance uniform are printed.

6. A liquid crystal display device as claimed in claim 1, wherein the protrusion has a cross section shaped like a triangle having a round corner at a vertex.

7. A liquid crystal display device comprising:

a liquid crystal display element having two substrates opposed to each other and a liquid crystal layer sandwiched between the two substrates;

a plurality of light sources disposed opposite to the display surface of the liquid crystal display element and radiating light to the liquid crystal display element; and a reflection member disposed opposite to the liquid crystal display element of the plurality of light sources, characterized in that the reflection member has, in the regions between the plurality of light sources, protrusions protruding to the plurality of light sources and arranged along the direction of extension of the plurality of light sources, and that the protrusion has means for preventing deformation.

8. A liquid crystal display device as claimed in claim 7, wherein the means for preventing deformation are a plurality of thin plates disposed between two sides of the protrusion protruding to the plurality of light sources in the direction perpendicular to the direction of extension of the plurality of light sources.

9. A liquid crystal display device as claimed in claim 7, wherein the means for preventing deformation is a notch made at the vertex where two sides of the protrusion protruding to the plurality of light sources cross each other.

10. A liquid crystal display device as claimed in claim 7, wherein the reflection member is made of synthetic resin.

11. A liquid crystal display device comprising:

a liquid crystal display element having two substrates opposed to each other and a liquid crystal layer sandwiched between the two substrates;

a plurality of light sources disposed opposite to the display surface of the liquid crystal display element and radiating light to the liquid crystal display element;

an optical member interposed between the liquid crystal display element and the plurality of light sources; and a reflection member disposed opposite to the liquid crystal display element of the plurality of light sources, characterized in that the reflection member has, in the regions between the plurality of light sources, protrusions protruding to the plurality of light sources and arranged along the direction of extension of the plurality of light sources, and that the protrusion has means for preventing deformation and is triangular in cross section when it is cut by a plane perpendicular to the direction of extension of the plurality of light sources, and that assuming that the distance between the center portions of the plurality of light sources is L, the distance between the reflection member and the center portions of the plurality of light sources being d1, the height of the protrusion being h, and an angle formed by two sides of the protrusion protruding to the plurality of light sources being θ, these factors satisfies the following relations $h \geq d1, \tan^{-1}(2(h+d1))/L \geq 90° - \theta$.

12. A liquid crystal display device as claimed in claim 11, wherein the protrusion has a cross section shaped like an isosceles triangle in which two sides of the protrusion protruding to the plurality of light sources are equal.

13. A liquid crystal display device as claimed in claim 12, wherein the vertex where two sides of the protrusion protruding to the plurality of light sources cross each other is in the middle portion between the center portions of the plurality of light sources.

14. A liquid crystal display device as claimed in claim 13, wherein assuming that the distance between the reflection member and the optical member is D, the distance D satisfies the following relation 10 mm<D<20 mm.

15. A liquid crystal display device as claimed in claim 13, wherein the optical member includes a diffusion plate on which patterns for making luminance uniform are printed.

16. A liquid crystal display device as claimed in claim 11, wherein the means for preventing deformation are a plurality of thin plates disposed between two sides of the protrusion protruding to the plurality of light sources in the direction perpendicular to the direction of extension of the plurality of light sources.

17. A liquid crystal display device as claimed in claim 11, wherein the means for preventing deformation is a notch made at the vertex where two sides of the protrusion protruding to the plurality of light sources cross each other.

18. A liquid crystal display device as claimed in claim 11, wherein the reflection member is made of synthetic resin.

* * * * *